United States Patent Office 3,127,425
Patented Mar. 31, 1964

3,127,425
6,17α-DISUBSTITUTED 9α,11β-DIHALOGENO DERIVATIVES OF A-RING UNSATURATED PREGNANE 3,20-DIONES
Hans Reimann, Bloomfield, and David H. Gould, Leonia, N.J., assignors to Schering Corporation, Bloomfield, N.J., a corporation of New Jersey
No Drawing. Filed May 29, 1961, Ser. No. 113,089
22 Claims. (Cl. 260—397.3)

This invention relates to novel, therapeutically useful 3,20-diketopregnanes having an unsaturation in the A-ring, and to methods for their manufacture. In particular, this invention relates to 17α-substituted-9α,11β-dihalogeno derivatives of A-ring unsaturated pregnane-3,20-diones which exhibit valuable progestational properties.

Novel pregnanes prepared by the process of our invention are the compounds represented by the following formulae:

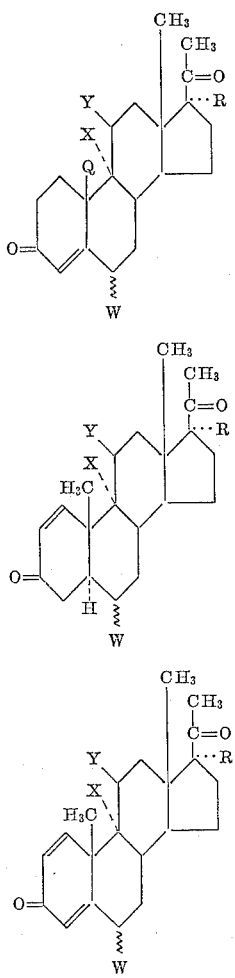

wherein X is a halogen having an atomic weight greater than 19; Y is a halogen having an atomic weight less than 126 and being at least as electronegative as X; Q is a member of the group consisting of hydrogen and methyl. R is a member of the group consisting of bromine, hydroxy and acyloxy and W is a member of the group consisting of hydrogen and methyl. The wavy line (∼) at the 6-carbon indicates that the W substituent may be either an α or β and the general formulae embraces both forms. In those instances where neither the α or β is specifically shown it is intended that both are embraced.

Our novel compounds are thus 9α,11β-dihalogeno derivatives of 17α-substituted progesterones, 17α-substituted-19-norprogesterones, 17α-substituted-1-allopregnene-3,20-diones and 17α-substituted-1,4-pregnadiene-3,20-diones and their corresponding 6α and 6β-methyl analogs.

Illustrative of the 17α-acyl groups in the 17α-acyloxy derivatives contemplated by our invention are lower alkanoates such as formate, acetate, propionate, butyrate, isobutyrate, valerate, isovalerate, pivalate, caproate, isocaproate, enanthate; substituted alkanoates such as β-cyclopentylpropionate, cyclohexylacetate, ethoxyacetate, phenylacetate, phenoxyacetate; unsaturated acyl radicals such as acrylate and crotanate; aromatic acyl radicals such as benzoate and toluate, as well as the residues of dibasic acids such as succinate and phthalate and of fatty acids such as undecanoate and laurate. The term "acyloxy" thus includes acyl radicals of monocarboxylic and dicarboxylic acids containing up to 12 carbon atoms.

As stated heretofore, the 11β-halogen present in a compound of the general formula or an analog thereof, must be at least as electronegative as the halogen, present in the 9α-position; fluorine being the most electronegative halogen, and iodine the least electronegative. Thus, a progesterone derivative of our invention containing a 9α-chloro group may possess an 11β-chloro or an 11β-fluoro group but cannot contain an 11β-iodo or 11β-bromo group. This artificial restriction is imposed in view of the limitation of the manufacturing process.

Typical derivatives contemplated by our invention are progesterones such as 9α,11β-dichloro-17α-hydroxyprogesterone and 9α-bromo-11β-chloro-17α-hydroxyprogesterone and the 17-acetate and 17-caproate esters thereof, as well as other 17-substituted progesterones such as 9α, 11β,17α-trichloroprogesterone, 9α-bromo-11β-fluoro-17α-chloroprogesterone, 9α,17α-dichloro-11β-fluoroprogesterone, 9α,11β-dichloro-17α-bromoprogesterone, 9α,6-methyl analogs such as 6-methyl-9α,11β-dichloro-17α-acetoxyprogesterone, 6α-methyl-9α,11β-dichloro-17α-hydroxyprogesterone, 6α-methyl-9α,11β-dichloro-17α - bromoprogesterone and include their 1-dehydro analogs and 19-norprogesterones such as 9α,11β-dichloro-17α-hydroxy-19-norprogesterone 17-(β-cyclopentylpropionate) 6α-methyl-9α,11β-dichloro-17α-hydroxy-1,4-pregnadiene-3,20 - dione 17-acetate and 9α-bromo-11β-fluoro-17α-hydroxy-19-norprogesterone 17-acetate, and 1-allopregnene derivatives exemplified by 9α,11β-dichloro-17α-hydroxy-1-allopregnene-3,20-dione 17-acetate and 9α-bromo-11β-chloro-17α-hydroxy-1-allopregnene-3,20-dione 17-acetate. Although our compounds (with the exception of the 17-hydroxy substituted compounds which are valuable as intermediates) are, in general, valuable progestins, the 17α-acyloxy-dihalogenated progesterones of the general formula are the preferred species and, in particular 9α,11β-dichloro-17α-hydroxyprogesterone 17-acetate, and 6α-methyl 9α, 11β-dichloro-17α-hydroxyprogesterone 17-acetate.

Our novel compounds are prepared by reacting a 4,9-(11)-pregnadiene-3,20-dione which may be substituted at the 6-carbon by methyl and at the 17-carbon by hydroxy, acyloxy, or halogen (or a similarly substituted 1,4, 9(11)-pregnatriene-3,20-dione or 1,9(11)-allopregnadiene-3,20-dione), with a suitable halogenating agent. The starting compounds utilized in this invention are therefore exemplified by compounds such as 17α-hydroxy-4,9(11)-pregnadiene-3,20-dione, 17α-acetoxy-4,9(11)-pregnadiene-3,20-dione, 17α-bromo-4,9(11)-pregnadiene - 3,20 - dione, 17α-chloro-4,9(11)-pregnadiene-3,20-dione, and their 6-methyl analogs as well as the 1-dehydro analogs of the foregoing, and pregnadienes such as 17α-hydroxy-4,9(11)-19-norpregnadiene-3,20-dione and 17α-hydroxy-1,9(11)-allopregnadiene-3,20-dione 17-acetate.

The starting compounds thus necessarily possess a $\Delta^{9,11}$-bond and, in the case of 17α-hydroxy-4,9(11)-pregnadiene-3,20-dione (17α-hydroxy-9(11)-dehydroprogesterone), the process of preparing this 9(11)-dehydroprogesterone is described in the literature. The other aforementioned starting 9(11)-dehydro starting compounds are prepared by a combination of processes analogous to those described in the literature. The 17α-acyloxy-9(11)-dehydroprogesterones (i.e. the 17α-acyloxy-4,9(11)-pregnadiene-3,20-diones) are prepared from 17α-hydroxy-9(11)-dehydroprogesterone according to known esterification techniques with a suitable acid such as acetic in the presence of trifluoroacetic anhydride or with a suitable acid anhydride (such as acetic) in the presence of an acidic catalyst such as p-toluenesulfonic acid. When other acids, such as caproic or β-cyclopentylpropionic are used in place of acetic in these esterification procedures, the corresponding 17α-ester is obtained, i.e. the 17α-caproate and 17α-β-cyclopentylpropionate of 17α-hydroxy-4,9(11)-pregnadiene-3,20-dione.

Other 9(11)-dehydro intermediates are prepared from 6,17-disubstituted 11,21-dihydroxylated progesterones. For example, 6α-methyl-17α-acetoxy-4,9(11)-pregnadiene-3,20-dione (6α-methyl-17α-acetoxy-9(11)-dehydroprogesterone) is prepared from 6α-methyl-11β,17α,21-trihydroxy-4-pregnene-3,20-dione 21-acetate (6α-methylhydrocortisone 21-acetate) by an initial dehydration effected by a reagent such as described above which yields 6α-methyl-17α,21-dihydroxy-4,9(11)-pregnadiene-3,20-dione 21-acetate. The 21-acetate ester is converted to a 21-sulfonate ester by initial hydrolysis of the 21-acetate with, for example methanolic perchloric acid to give 6α-methyl-17α,21-dihydroxy-4,9(11)-pregnadiene-3,20-dione followed by subsequent treatment of the 21-hydroxy compound with a sulfonyl chloride such as p-toluenesulfonyl chloride. Treatment of the 6α-methyl-17α,21-dihydroxy-4,9(11)-pregnadiene-3,20-dione 21-p-toluenesulfonate thus produced with, for example, sodium iodine in acetone, followed by reduction of the 21-iodo analog thereby formed with sodium bisulphite, yields 6α-methyl-17α-hydroxy-4,9(11)-pregnadiene-3,20-dione (6α-methyl-17α-hydroxy-9(11)-dehydroprogesterone). Esterification of the 17-hydroxyl groups by procedures heretofore described yields requisite starting pregnadienes for our process such as 6α-methyl-17α-acetoxy-4,9(11)-pregnadiene-3,20-dione (6α-methyl-17α-hydroxy-9(11)-dehydroprogesterone 17-acetate). Another 17-substituted-9(11)-dehydro starting compound prepared from a 21-hydroxy intermediate is 17α-hydroxy-1,9(11)-bisdehydroprogesterone (17α-hydroxy-1,4,9(11)-pregnatriene-3,20-dione). The starting compound 17α,21-dihydroxy-1,9(11)-bisdehydroprogesterone 21-acetate (17α,21-dihydroxy-1,4,9(11)-pregnatriene-3,20-dione 21-acetate) is hydrolyzed to the corresponding 21-ol, 17α,21-dihydroxy-1,9(11)-bisdehydroprogesterone (17α,21-dihydroxy-1,4,9(11)-pregnatriene-3,20-dione). The latter is then treated with a sulfonating agent, such as p-toluenesulfonyl chloride in pyridine (or methanesulfonyl chloride in methylene chloride-pyridine) which yields the corresponding C-21-tosylate (p-toluenesulfonate) or mesylate (methanesulfonate). The tosylate is replaced by iodine by means of sodium iodide in acetone, the 21-iodide upon subsequent reaction with sodium bisulfite solution yielding the 21-desoxy compound 17α-hydroxy-1,9(11)-bisdehydroprogesterone (17α-hydroxy-1,4,9(11)-pregnatriene-3,20-dione).

When an 11-hydroxy intermediate is not available, as in the case of 11β-hydroxy-17α-bromoprogesterone, the hydroxyl group is introduced microbiologically into the 11-desoxy analog, 17α-bromoprogesterone, by means of a microorganism such as *Curvularia lunata* (N.R.R.L. 2380) by procedures analogous to those described in U.S. Patent No. 2,658,023. The 11β-hydroxy-17α-bromoprogesterone thus produced upon treatment with, for example, lithium bromide in glacial acetic acid yields 17α-bromo-9(11)-dehydroprogesterone (17α-bromo-4,9(11)-pregnadiene-3,20-dione). In like manner, 17α-acetoxy-1-allopregnene-3,20-dione (17α-hydroxy-1-allopregnene-3,20-dione 17-acetate) is 11-hydroxylated by means of *Curvularia lunata* to give 11β,17α-dihydroxy-1-allopregnene-3,20-dione 17-acetate which when dehydrated with an agent such as methanesulfonyl chloride in pyridine yields 17α-acetoxy-1,9(11)-allopregnadiene-3,20-dione.

Our 9(11)-dehydro starting compounds may also be prepared by introducing an 11α-hydroxyl group into a 6,17-disubstituted-11-desoxy progesterone through the action of a microorganism such as *Rhizopus nigricans* (A.T.C.C. 6227b) using procedures analogous to those described in U.S. Patent No. 2,602,769. Subsequent treatment of the 11α-hydroxyprogesterone derivative so obtained with a sulfonyl chloride such as methanesulfonyl chloride or toluenesulfonyl chloride yields the corresponding 11α-sulfonate which when treated with a base such as pyridine gives the desired 6,17-disubstituted 9(11)-dehydroprogesterone derivative.

To obtain 6,17α-disubstituted-9(11)-dehydroprogesterones from a 17α-substituted progesterone such as 17α-bromoprogesterone, known chemical techniques are employed. Typically 17α-bromoprogesterone, is treated with ethylene glycol by known procedures to form the 3,20-bisethylene ketal derivative which, in turn, is epoxidized on treatment with, for example, monoperphthalic acid to give 5α,6α-epoxy-17α-bromopregnane-3,20-dione 3,20-bisethylene ketal. From this epoxy intermediate the 6-methyl substituent is introduced into the pregnane nucleus. Thus the addition of a Grignard reagent such as methyl magnesium iodide with subsequent hydrolysis yields 5α-hydroxy-6β-methyl-pregnane-3,20-dione. A reagent such as ethanolic hydrochloric acid on these 5α-hydroxy-6β-substituted-17α-methylpregnanes simultaneously dehydrates the hydroxy group and epimerizes the 6β-constituent to yield 6α-methyl-17α-bromoprogesterone. In order to obtain a 6-substituent in the β-position, the 5α-hydroxy-6β-substituted pregnanes intermediates are treated with, for example, thionyl chloride in a cold basic medium such as pyridine to give 6β-methyl-17α-bromoprogesterone. The 6α-substituted progesterones may also be prepared from the corresponding 6β-substituted isomers by means of alcoholic solutions of acids or bases such as ethanolic hydrogen chloride and ethanolic potassium hydroxide.

The 1-dehydro intermediates, i.e. 17α-bromo-1,9(11)-bisdehydroprogesterone (17α-bromo-1,4,9(11)-pregnatriene-3,20-dione), 17α-chloro-1,9(11)-bisdehydroprogesterone (17α-chloro-1,4,9(11)-pregnatriene-3,20-dione), 17α-hydroxy-1,9(11)-disdehydroprogesterone (17α-hydroxy-1,4,9(11)-pregnatriene-3,20-dione) and their 6-methyl analogs and 17α-acyloxy intermediates such as 17α-acetoxy-1,9(11)-bisdehydroprogesterone (17α-hydroxy-1,4,9(11)-pregnatriene-3,20-dione 17α-acetate) and their 6-methyl analogs are conveniently prepared from the corresponding 17α-substituted-9(11)-dehydroprogesterone by microbiological dehydrogenation with an organism such as, for example, *Corynebacterium simplex* (A.T.C.C. 6946) in a manner similar to that described in U.S. Patent No. 2,837,464, or by chemical oxidation through the use of such reagents as chloranil or selenium dioxide, or by halogenation followed by dehydrohalogenation.

Halogenating agents suitable for use in our process are:
(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used alone or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteroatomic molecular halogen, a source of the more electronegative anion is used, i.e. a suitable chloride salt or hydrochloric acid is used in a reaction employing iodine monochloride.

(2) Addition compounds of molecluar halogens, said molecular halogens having a molecular weight greater than 38 and less than 253. Examples of such addition compounds are pyridinium bromide perbromide, pyridinium chloride perchloride, dioxane dibromide, iodobenzene dichloride, and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such as N-chlorosuccinimide, N-bromoacetamide, dimethyl-N,N-dibromohydantoin, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximate theoretical quantities are generally used; whereas if a salt is used as the halogen anion source it may be present in large excess. Such an excess of anion is frequently useful to obtain an increased yield or greater purity of product.

Thus, our novel compounds may be prepared by any one of several methods. For example, $9\alpha,11\beta$-dichloro-$17\alpha$-hydroxyprogesterone 17-acetate may be prepared from $17\alpha$-hydroxy-9(11)-dehydroprogesterone 17-acetate by utilizing such reagents and combinations as (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

An alternate route for preparing the $17\alpha$-acyloxy compounds of our invention is halogenating $17\alpha$-hydroxy-9(11)-dehydroprogesterone the 6-methyl analog thereof (or the 1-dehydro analog or 19-nor analog thereof or a $17\alpha$-hydroxy-1,9(11)-allopregnadiene-3,20-dione) by any of the above described halogenating methods of our invention, with subsequent esterification of the $9\alpha,11\beta$-dihalogeno-$17\alpha$-hydroxyprogesterone (or the 1-dehydro or 19-nor analog or the $9\alpha,11\beta$-dihalogeno-$17\alpha$-hydroxy-1-allopregnene-3,20-dione) thereby obtained. In this manner $17\alpha$-hydroxy-9(11)-dehydroprogesterone, upon chlorination with a reagent such as chlorine in carbon tetrachloride in the presence of pyridine, yields $9\alpha,11\beta$-dichloro-$17\alpha$-hydroxyprogesterone which, when esterified with acetic acid and trifluoroacetic anhydride, for example, gives $9\alpha,11\beta$-dichloro-$17\alpha$-hydroxyprogesterone 17-acetate. Other acids may be substituted for acetic acid in the esterification step to obtain the corresponding $17\alpha$-acyloxy dihalogenated progesterone.

Our novel halogenating process is also useful in preparing the 1,4-pregnadienes of our invention. In addition, our novel halogenated 1-dehydroprogesterones are obtained from the corresponding halogenated progesterones by microbiological or chemical dehydrogenation techniques as heretofore described. Thus, $9\alpha,11\beta$-dichloro-$17\alpha$-acetoxyprogesterone or its 6-methylanalog is converted to $9\alpha,11\beta$-dichloro-$17\alpha$-acetoxy-1-dehydroprogesterone or its 6-methyl analog by the action of a culture of the microorganism *Corynebacterium simplex*.

Our process, whereby a 17-substituted or 6,17 disubstituted-9(11)-dehydroprogesterone is converted to a $17\alpha$-substituted or 6,17-disubstituted $9\alpha,11\beta$-dihalogeno derivative is generally carried out in the presence of a non-reacting solvent at temperatures ranging from 5° C. to 50° C. with reaction times varying from one-half to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in our dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethylsulfoxide, as well as suitable mixtures of these solvents.

Further, when carrying out the above-described process in a halogenated hydrocarbon solvent such as methylene chloride, chloroform or carbon tetrachloride, the yield and purity of the dihalogenated progesterone obtained is greatly increased by adding pyridine to the reaction mixture. Preferably from one to five equivalents of pyridine is added, based on the amount of steroid being converted. Other organic basic agents which may also be used in conjunction with a halogenated hydrocarbon solvent are aromatic tertiary amines such as lutidine, collidine, alkyl substituted pyridines, and the like. The reaction is usually carried out initially at −20° C. with subsequent warming to about room temperature. The reaction time may be as short as five minutes or as long as several hours. In general the optimum reaction time is about one hour.

Our process whereby a 17-substituted-9(11)-dehydroprogesterone is converted to a 17-substituted-$9\alpha,11\beta$-dihalogeno progesterone is also applicable, as mentioned previously, to 17-substituted-9(11)-dehydro - 19 - norprogesterones. With the aforementioned 9(11)-dehydro-19-norprogesterones there are produced the novel progestational agents, $9\alpha$-X-$11\beta$-Y - $17\alpha$-R - 19 - norprogesterones wherein X, Y and R are as heretofore described. Thus, $17\alpha$ - methyl - 9(11) - dehydro-19 - norprogesterone $17\alpha$-bromo-9(11)-dehydro-19 - norprogesterone ($17\alpha$-bromo-19-nor-4,9(11)-pregnadiene - 3,20 - dione), $17\alpha$-chloro-9-(11)-dehydro-19-norprogesterone ($17\alpha$-chloro-19 - nor-4,9(11)-pregnadiene-3,20-dione), $17\alpha$-hydroxy - 9(11)-dehydro-19-norprogesterone ($17\alpha$-hydroxy-19-nor-4,9(11)-pregnadiene-3,20-dione) and $17\alpha$-acyloxy-9(11)-dehydro-19-norprogesterones ($17\alpha$-acyloxy-19-nor-4,9(11)-pregnadiene-3,20-diones), when reacted with chlorine in carbon tetrachloride in the presence of pyridine, for example, are converted to their respective $9\alpha,11\beta$-dichloroderivatives.

When preparing a $9\alpha,11\beta$-dihalogenated $17\alpha$-acyloxy-19-norprogesterone by our process the halogenation step is preferably performed on the corresponding 17α-hydroxy-9(11)-dehydro intermediates prior to esterification of the 17-hydroxy group. Thus, 17α-hydroxy-9(11)-dehydroprogesterone is first converted to a 9α,11β-dihalogenated-17α-hydroxy-19 - norprogesterone which is then esterified by methods heretofore described to give the 9(11)-dihalogenated-17α-acyloxyprogesterone.

Our novel dihalogenated 17-substituted progesterones, their 1-dehydro and 19-nor analogs, as well as the dihalogenated 17-substituted-1-allopregnenes of our invention and the 6α and 6β-methyl analogs thereof, (except those having a hydroxy group at C–17) are very active progestational agents being specific in their action, and devoid of androgenic, estrogenic or corticoid activity. That our compounds have progestational activity at all is surprising in view of the well known fact that substitution in ring-C of progesterone and its derivatives such as, for example, 11-hydroxyprogesterone and the 11-acyloxy derivatives thereof eliminates progestational activity or reduces it to such an extent that the compounds are useless for therapeutic purposes. Our ring-C halogenated-17-substituted progesterones, on the other hand, are significantly more active than progesterone by the intramuscular route. Moreover, orally our compounds are several times as active as ethisterone, the known standard progestational agent.

In addition to being active, both orally and intramuscularly, our halogenated progestins possess the added advantage of having a minimum effect on water, sodium and potassium metabolism. Thus, they may be administered without causing the usual side effects associated with electrolyte imbalance.

Our therapeutically active compounds are useful for the treatment of conditions requiring progestational agents such as the maintenance of pregancy, or treatment of functional dysmenorrhea, premenstrual tension, habitual or threatened abortion. When administered orally, our compounds are preferably used in the form of tablets containing from 1 to 100 mg. together with the excipients such as starch or milk sugar. For subcutaneous and intramuscular administration, solutions or suspensions of our compounds with a non-toxic liquid vehicle are used. The dosage required may vary with the indications being treated and may range from about 5 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The 17α-hydroxy and 6-methyl 17α-hydroxy compounds of our invention, i.e. the 17α-hydroxy-9α,11β-dihalogenoprogesterones and their 6-methyl analogs, the 17α - hydroxy - 9α,11β - dihalogeno - 1 - dehydroprogesterones, the 17α-hydroxy-9α,11β-dihalogeno-19-norprogesterone, and the 17α-hydroxy-9α,11β-dihalogeno-1-allopregnene-3,20-diones, are valuable mainly as intermediates in the preparation of the corresponding 17α-acyloxy compounds, which are active progestational agents.

The following examples are illustrative of the procedures employed in preparing the compounds of this invention, but are not to be construed as limiting the scope thereof; the scope of our invention being limited only by the appended claims.

This application is a continuation-in-part of our copending applications Serial Nos. 817,050, now abandoned, and 817,054, both filed on June 1, 1959.

EXAMPLE 1

*17α-Hydroxy-4,9(11)-Pregnadiene-3,20-Dione 17-Acetate*

To a solution of 5.0 g. of 17α-hydroxy-4,9(11)-pregnadiene-3,20-dione in 50 ml. of acetic acid there is added 10 ml. of trifluoroacetic anhydride. The solution is heated on the steam bath for 45 minutes, then is poured into ice-water. A solid separates which is filtered and crystallized from acetone-ether to give 17α-hydroxy-4,9(11)-pregnadiene-3,20-dione 17-acetate, M.P. 238–241° C., $[\alpha]_D+50°$ (chloroform);

$$\lambda_{max.}^{MeOH}\ 239\ m\mu,\ E=17,000$$

*Analysis.*—Calcd. for $C_{23}H_{30}O_4$: C, 74.56; H, 8.16. Found: C, 74.64; H, 8.07.

EXAMPLE 2

*17α-Hydroxy-4,9(11)-Pregnadiene-3,20-Dione 17-Caproate*

A mixture of 1.0 g. of 17α-hydroxy-4,9(11)-pregnadiene-3,20-dione and 5 ml. of caproic acid is heated at 80° C., in the presence of 1.0 ml. of trifluoroacetic anhydride, for 45 minutes. The mixture is poured into ice-water and the excess acid neutralized with sodium carbonate. The crude reaction mixture is extracted with methylene chloride. The organic extracts are combined and concentrated to a residue which is chromatographed on Florisil. The material eluted with 10–25% ether in hexane is combined and crystallized from pentane to yield 17α-hydroxy-4,9(11)-pregnadiene-3,20-dione 17-caproate, M.P. 126–128° C., $$\lambda_{max.}^{MeOH}\ 239\ m\mu\ (E=16,800)$$

$[\alpha]_D+42°$ (chloroform).

*Analysis.*—Calcd. for $C_{27}H_{38}O_4$: C, 76.02; H, 8.98. Found: C, 76.11; H, 8.94.

EXAMPLE 3

*17α-Hydroxy-4,9(11)-Pregnadiene-3,20-Dione 17-(β-Cyclopentylpropionate)*

To a solution of 500 mg. of 17α-hydroxy-4,9(11)-pregnadiene-3,20-dione in 10 ml. of β-cyclopentylpropionic acid and 2.5 ml. of β-cyclopentylpropionic anhydride in a vessel flushed with nitrogen, there is added 200 mg. a p-toluenesulfonic acid with stirring at a temperature of about 20° C. The reaction mixture is allowed to stand for 4 hours, then poured into ice-water. Excess acid is neutralized with sodium carbonate, and the crude mixture is extracted with ether. The ether extracts are combined, washed with water, dried over magnesium sulfate, filtered, and concentrated to a residue. The residue is crystallized from methanol to give 17α-hydroxy - 4,9(11) - pregnadiene - 3,20 - dione 17 - (β-cyclopentylpropionate), $$\lambda_{max.}^{MeOH}\ 239\ m\mu$$

EXAMPLE 4

*9α,11β-Dichloro-17α-Hydroxyprogesterone 17-Acetate*

A solution of 1 g. of 17α-hydroxy-4,9(11)-pregnadiene-3,20-dione 17-acetate (the compound of Example 1) and 4 g. of lithium chloride in 40 ml. of glacial acetic acid is cooled to about 10° C. and there is added 250 mg. of hydrogen chloride in 1 ml. of tetrahydrofuran followed by 395 mg. of 96% N-chlorosuccinimide. The solution is stirred at room temperature for 20 minutes in the absence of light, then is poured into ice-water with stirring. A precipitate forms which is filtered, washed with water, triturated with ether and crystallized twice from acetone-hexane to give 9α,11β-dichloro-17α-hydroxyprogesterone 17-acetate, M.P. 224–233° C. dec., $[\alpha]_D+129°$ (chloroform);

$$\lambda_{max.}^{MeOH}\ 238\ m\mu,\ E=17,000$$

*Analysis.*—Calcd. for $C_{23}H_{30}O_4Cl_2$: C, 62.58; H, 6.85; Cl, 16.06. Found: C, 62.63; H, 7.03; Cl, 15.90.

Alternatively, the compound of this example is prepared by adding a solution of 200 mg. of chlorine in 30 ml. of acetic acid to a mixture of 1 g. of 17α-hydroxy-4,9(11)-pregnadiene-3,20-dione 17-acetate and 4 g. of lithium chloride in 20 ml. of glacial acetic acid. The mixture is stirred at room temperature for 3 hours, then poured into ice-water with stirring. A solid product precipitates which is filtered, washed with water, triturated with ether, and crystallized from acetone-hexane to give 9α,11β-dichloro-17α-hydroxyprogesterone 17-acetate.

A second alternative for the preparation of the compound of this example is by reacting 1 g. of 17α-hydroxy-4,9(11)-pregnadiene-3,20-dione 17-acetate dissolved in 30 ml. of carbon tetrachloride with 18 ml. of chlorine in carbon tetrachloride (111 mg./ml.) in the presence of 0.65 ml. of pyridine at −20° C. The mixture is stirred at −20° C. for 15 minutes, then is allowed to warm to room temperature over a period of one-half hour. The solution is filtered and the filtrate concentrated in vacuo to an oily residue. Trituration of this residue with ether yields solid material which is crystallized from acetone-hexane to give 9α-11β-dichloro-17α-hydroxyprogesterone 17-acetate.

EXAMPLE 5

*9α-Bromo-11β-Chloro-17α-Hydroxyprogesterone 17-Acetate*

One gram of 17α-hydroxy-4,9(11)-pregnadiene-3,20-dione 17-acetate (the compound of Example 1) and 4 g. of lithium chloride is dissolved in 50 ml. of glacial acetic acid and there is added 420 mg. of N-bromoacetamide. The mixture is stirred at room temperature and a slow stream of gaseous hydrogen chloride is passed over the surface until the solution begins to darken (10–30 seconds). The hydrogen chloride gas is removed and the solution is stirred in the dark room temperature for about 10 minutes. The solution is poured into ice-water with stirring and the resultant solid is filtered, washed with water, and crystallized from acetone-hexane to give 9α - bromo - 11β - chloro - 17α - hydroxyprogesterone 17-acetate, M.P. 124–129° C. dec., [α]$_D$+142° (chloroform);

$\lambda_{max.}^{MeOH}$ 242 m$\mu$, E=15,600

*Analysis.*—Calcd. for $C_{23}H_{30}O_4BrCl$: C, 56.85; H, 6.22; Br, 16.45; Cl, 7.30. Found: C, 56.83; H, 6.28; Br, 16.07; Cl, 7.35.

EXAMPLE 6

*9α-Bromo-11β-Fluoro-17α-Hydroxyprogesterone 17-Acetate*

To a solution of 1 g. of 17α-hydroxy-4,9(11)-pregnadiene-3,20-dione 17-acetate (the compound of Example 1) and 425 mg. of N-bromoacetamide in 50 ml. of diethylacetic acid there is added a solution of 500 mg. of hydrogen fluoride in 4.7 ml. of chloroformtetrahydrofuran. The solution is stirred at room temperature for 2 hours, then poured into ice-water with stirring. The acid is neutralized by addition of sodium bicarbonate and a resinous precipitate forms from which the aqueous solution is decanted. The precipitate is then dissolved in methylene chloride and the solution is washed with 5% aqueous sodium hydroxide, then with water, is dried over magnesium sulfate, filtered and concentrated in vacuo. The resultant residue is triturated with pentane, filtered and crystallized from methylene chloride-pentane to give 9α - bromo - 11β - fluoro - 17α - hydroxyprogesterone 17-acetate, M.P. 176–180° C. dec., $\lambda_{max.}^{MeOH}$ 240 m$\mu$, E=16,100

[α]$_D$+81° (chloroform).

*Analysis.*—Calcd. for $C_{23}H_{30}O_4BrF$: Br; 17.03; F, 4.05. Found: Br, 17.56; F, 3.85.

EXAMPLE 7

*9α,11β-Dichloro-17α-Hydroxyprogesterone 17-Caproate*

17α - hydroxy - 4,9(11) - pregnadiene - 3,20 - dione 17-caproate (the compound of Example 2) is reacted with 165 mg. of N-chlorosuccinimide, hydrogen chloride and lithium chloride in the manner described in Example 4. The resultant product is isolated and purified in the described manner to give 9α-11β-dichloro-17α-hydroxyprogesterone 17-caproate, $\lambda_{max.}^{MeOH}$ 238 m$\mu$

EXAMPLE 8

*9α,11β-Dichloro-17α-Hydroxyprogesterone 17-(β-Cyclopentylpropionate)*

17α - hydroxy - 4,9(11) - pregnadiene - 3,20-dione 17-(β-cyclopentylpropionate), the compound of Example 3, is reacted with chlorine and lithium chloride in the manner of Example 4 and the resultant product isolated and purified to give 9α,11β-dichloro-17α-hydroxyprogesterone 17-(β-cyclopentylpropionate), $\lambda_{max.}^{MeOH}$ 238 m$\mu$

EXAMPLE 9

*9α,11β-Dibromo-17α-Hydroxyprogesterone 17-Acetate*

To a solution of 1 g. of 17α-hydroxy-4,9(11)-pregnadiene-3,20-dione 17-acetate (the compound of Example 1) and 4 g. of lithium bromide in 50 ml. of acetic acid there is added 400 mg. of N-bromoacetamide followed by a solution of 220 mg. of hydrogen bromide in 4.3 ml. of acetic acid. The mixture is stirred at room temperature for one hour, then is poured into ice-water. A solid forms which is filtered, washed with water, then crystallized and recrystallized twice from acetone-hexane to give 9α,11β-dibromo-17α-hydroxyprogesterone 17-acetate, $\lambda_{max.}^{MeOH}$ 241 m$\mu$

EXAMPLE 10

*9α-Iodo-11β-Chloro-17α-Hydroxyprogesterone 17-Acetate*

To a solution of 1 g. of 17α-hydroxy-4,9(11)-pregnadiene-3,20-dione 17-acetate (the compound of Example 1) in 40 ml. of tetrahydrofuran which is chilled to 0° C. there is added 3 drops of perchloric acid and 3 g. of lithium chloride followed by the dropwise addition of a solution of 470 mg. of iodine monochloride in 5 ml. of tetrahydrofuran. The reaction mixture is stirred at room temperature for 5 hours, then poured into ice water. A gummy precipitate forms which is dissolved in methylene chloride, the solution is warmed, decolorizing carbon added, then filtered. Pentane is added to the clarified methylene chloride solution and a precipitate is formed which is filtered and crystallized from acetone-hexane to give 9α-iodo-11β-chloro-17α-hydroxyprogesterone 17-acetate.

EXAMPLE 11

*9α-Chloro-11β-Fluoro-17-Hydroxyprogesterone 17-Acetate*

To a solution of 500 mg. of 17α-hydroxy-4,9(11)-pregnadiene-3,20-dione 17-acetate (the compound of Example 23) in 25 ml. of diethylacetic acid there is added 195 mg. of N-chlorosuccinimide followed by a solution of 620 mg. of hydrogen fluoride in 3.2 ml. of a mixture of tetrahydrofuran and chloroform. The reaction mixture is stirred at room temperature for 48 hours, then is poured into an aqueous sodium carbonate solution. The mixture is extracted with methylene chloride. The organic extracts are combined and evaporated to a residue which is chromatographed on silica gel. The product eluted with 20% ether in hexane is crystallized with acetone-hexane to give 9α-chloro-11β-fluoro-17-hydroxyprogesterone 17-acetate $\lambda_{max.}^{MeOH}$ 238 m$\mu$

EXAMPLE 12

*9α-Iodo-11β-Fluoro-17-Hydroxyprogesterone 17-Acetate*

To a solution of 500 mg. of 17α-hydroxy-4,9(11)-pregnadiene-3,20-dione 17-acetate (the compound of Example 23) and 3 g. of potassium fluoride in 40 ml. of dimethylsulfoxide there is added 320 mg. of N-iodosuccinimide. The reaction mixture is stirred at room temperature for 16 hours, poured into ice-water and extracted with methylene chloride. The combined organic extracts are warmed, decolorizing carbon added, then filtered, and the filtrate concentrated in vacuo. The resultant residue is chromatographed on silica gel. The fraction eluted with 50% ether-hexane yields 9α-iodo-11β-fluoro-17-hydroxyprogesterone 17-acetate.

EXAMPLE 13

17α-Hydroxy-1,4,9(11)-Pregnatriene-3,20-Dione

A. *17α,21 - dihydroxy - 1,4,9(11)-pregnatriene-3,20-dione.*—A solution of 2 g. of 17α,21-dihydroxy-1,4,9(11)-pregnatriene-3,20-dione 21-acetate in 100 ml. of 3:1 methanol chloroform mixture is chilled in ice to which there is added dropwise 52 ml. of 0.1 N-sodium hydroxide solution (one equivalent). The reaction mixture is stirred at 0° C. for 10 minutes, then diluted with water and extracted with methylene chloride. Evaporation of the solvent and crystallization of the residue from acetonehexane affords 17α,21-dihydroxy-1,4,9(11)-pregnatriene-3,20-dione, M.P. 220–228° C. dec., $$\lambda_{max.}^{MeOH}\ 238\ m\mu,\ E=15{,}500$$

*Analysis.*—Calcd. for $C_{21}H_{26}O_4$: C, 73.66; H, 7.66. Found: C, 73.58; H, 7.54.

B. *17α-hydroxy-1,4,9(11)-pregnatriene-3,20-dione.*—A solution of 10 g. of 17α,21-dihydroxy-1,4,9(11)-pregnatriene-3,20-dione (the compound of Example 13A) in 100 ml. of dry pyridine is chilled in a Dry Ice-acetone bath and there is added a solution of 6 g. of p-toluene sulfonyl chloride in 50 ml. of methylene chloride. The mixture is stirred in the cold bath for 2 hours and then kept at —20° C. for 24 hours. At the end of this time, the reaction mixture is diluted with methylene chloride and the solution washed first with water, then with 10% sulfuric acid, 10% sodium bicarbonate, very dilute hydrochloric acid and finally with water. The solution is dried over magnesium sulfate, filtered and concentrated to a residue which is dissolved in acetone. The acetone solution is warmed on the steam bath, decolorizing carbon added, and the solution filtered. To the clarified solution there is added a warm solution of 10 g. of sodium iodide in acetone. After heating this mixture on the steam bath for five minutes, three ml. of acetic acid is added, and the mixture is warmed briefly, and then treated with aqueous sodium bisulfite. The resulting pale yellow solution is poured into water and the resulting precipitate is filtered and washed with water, and crystallized from acetone-ether to give 17α-hydroxy-1,4,9(11)-pregnatriene-3,20-dione, M.P. 233–235° C.

$$\lambda_{max.}^{MeOH}\ 238\ m\mu$$

E=15,600; [α]<sub>D</sub>—19° C. (chloroform.

EXAMPLE 14

17α-Hydroxy-1,4,9-(11)-Pregnatriene-3,20-Dione 17-Acetate

A solution of 5 g. of 17α-hydroxy-1,4,9(11)-pregnatriene-3,20-dione (the compound of Example 13) is dissolved in 50 ml. of glacial acetic acid and 10 ml. of trifluoroacetic anhydride. The solution is left at room temperature for 24 hours, then poured into ice-water. A solid separates which is filtered, washed with water, and crystallized from acetone-hexane to give 17α-hydroxy-1,4,9(11)-pregnatriene-3,20-dione 17-acetate $$\lambda_{max.}^{MeOH}\ 238\ m\mu$$

By subjecting the compounds of Examples 13 or 14 to the halogenation and/or esterification reactions described heretofore there is obtained the following compounds: 9α,11β-dichloro-17α-hydroxy - 1,4 - pregnadiene-3,20-dione M.P. 230–235° C. dec., 9α-iodo-11β-chloro-17α-hydroxy - 1,4 - pregnadiene-3,20-dione 9α-chloro-11β-fluoro-17α-hydroxy-1,4-pregnadiene-3,20-dione 9α-bromo-11β-chloro-17α-hydroxy - 1,4 - pregnadiene-3,20-dione 9α-bromo - 11β - fluoro - 17α - hydroxy-1,4-pregnadiene-3,20-dione 9α,11β-dibromo-17α-hydroxy-1,4-pregnadiene-3,20-dione and the acetates, caproates and cyclopentylpropionates thereof.

EXAMPLE 15

17α-Hydroxy-19-Nor-4,9(11)-Pregnadiene-3,20-Dione

A. *11β,17α-dihydroxy-19-norprogesterone.*—A living culture of the organism *Curvularia lunata* (N.R.R.L. 2380) is rinsed from an agar slant under sterile conditions into a sterile medium having the following composition:

|  | Percent |
|---|---|
| Malt extract | .5 |
| Sucrose | .1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

100 ml. of this medium is placed in each of several 300 ml. flasks. To each flask is added 50 mg. of 17α-hydroxy-19-norprogesterone dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 11β,17α-dihydroxy-19-norprogesterone.

B. *17α - hydroxy - 19 - nor-4,9(11)-pregnadiene-3,20-dione.*—Two grams of 11β,17α-dihydroxy-19-norprogesterone, in 50 ml. of pyridine is chilled to 0° C., and there is added 5 ml. of methanesulfonyl chloride dissolved in 10 ml. of pyridine. The mixture is allowed to stand in the ice-box for 96 hours. A small amount of ice is added to the reaction mixture, and the solution is diluted with chloroform, washed with water, then with 5% hydrochloric acid, 5% sodium bicarbonate and finally again with water. The solution is dried over sodium sulfate, filtered, and concentrated in vacuo to a residue which is crystallized from methylene chloride-hexane to give 17α-hydroxy-19-nor-4,9(11)-pregnadiene-3,20-dione.

By subjecting the compounds of Example 15B to the halogenation and/or esterification reactions described heretofore, there is obtained the following compounds:

9α,11β-dichloro-17α-hydroxy-19-norprogesterone 17-acetate,

9α,11β-dichloro-17α-hydroxy-19-norprogesterone 17-(β-cyclopentylpropionate),

9α-bromo-11β-chloro-17α-hydroxy-19-norprogesterone 17-acetate,

9α-bromo-11β-fluoro-17α-hydroxy-19-norprogesterone 17-acetate,

9α-iodo-11β-chloro-17α-hydroxy-19-norprogesterone 17-acetate,

9α,11β-dibromo-17α-hydroxy-19-norprogesterone 17-acetate.

In a similar fashion, by substituting other lower alkanoic acids such as propionic, butyric and caproic for acetic acid in the above procedure, the corresponding 17-lower alkanoates are formed, that is, the 17-propionate, 17-butyrate or 17-caproate respectively.

EXAMPLE 16

*17α-Bromo-4,9(11)-Pregnadiene-3,20-Dione*

A. *17α-bromo-11β-hydroxyprogesterone.*—17α-bromo-progesterone is subjected to the action of a culture of *Curvularia lunata* in the manner described in Example 15A and the resultant product isolated in the described manner and crystallized twice from ethyl-acetate to give 17α-bromo-11β-hydroxyprogesterone.

B. *17α - bromo - 4,9(11) - pregnadiene-3,20-dione.*—A mixture of 2 g. of 17α-bromo-11β-hydroxyprogesterone, and 4 g. of dry lithium bromide in 50 ml. of glacial acetic acid is refluxed under anhydrous conditions for 30 minutes. The solution is then cooled and poured into ice water. A solid precipitates which is filtered, washed well with water and recrystallized twice from acetone-hexane to give 17α-bromo-4,9(11)-pregnadiene-3,20-dione.

By subjecting the compounds of Example 16B to the halogenation and/or esterification reactions described heretofore there is obtained the following compounds:

9α,11β-dichloro-17α-bromoprogesterone,
9α,17α-dibromo-11β-chloroprogesterone,
9α-chloro-11β-fluoro-17α-bromoprogesterone,
9α-iodo-11β,17α-dibromoprogesterone,
9α,11β,17α-tribromoprogesterone.

EXAMPLE 17

*17α-Bromo-1,4,9(11)-Pregnatriene-3,20-Dione*

The 17α-bromo-4,9(11)-pregnadiene-3,20-dione of Example 16, is subjected to the action of a culture of *Corynebacterium simplex* in the manner described in the alternative procedure of Example 4, and the resultant product isolated and purified in the described manner to give 17α-bromo-1,4,9(11)-pregnatriene-3,20-dione.

By subjecting the compound of Example 17, to the halogenation and/or esterification reaction described hereinabove the following compounds are obtained:

9α,11β-dichloro-17α-bromo-1,4-pregnadiene-3,20-dione,
9α,17α-dibromo-11β-chloro-1,4-pregnadiene-3,20-dione,
9α,17α-dibromo-11β-fluoro-1,4-pregnadiene-3,20-dione,
9α,11β,17α-tribromo-1,4-pregnadiene-3,20-dione.
9α-iodo-11β,17α-dibromo-1,4-pregnadiene-3,20-dione.

EXAMPLE 18

*17α-Hydroxy-1,9(11)-Allopregnadiene-3,20-Dione 17-Acetate*

A. *11β,17α - dihydroxy-1-allopregnene-3,20-dione 17-acetate.*—In the manner described in Example 15A, 17α-hydroxy-1-allo-pregnene-3,20-dione 17-acetate is subjected to the action of a culture of the organism *Curvularia lunata*. The resultant product is isolated and purified in the described manner to give 11β,17α-dihydroxy-1-allopregnene-3,20-dione 17-acetate.

B. *17α-hydroxy-1,9(11)-allopregnadiene-3,20-dione 17-acetate.*—The 11β-hydroxy allopregnene of Example 18A is reacted with methanesulfonyl chloride in pyridine and the resultant product isolated and purified in the manner described in Example 15B to give 17α-hydroxy-1,9(11)-allopregnadiene-3,20-dione 17-acetate.

By subjecting the compounds of Example 18B to the halogenation and/or esterification reactions described heretofore there is obtained the following compounds:

9α,11β-dichloro-17α-hydroxy-1-allopregnene-3,20-dione 17-acetate,
9α-bromo-11β-chloro-17α-hydroxy-1-allopregnene-3,20-dione 17-acetate,
9α,11β-dichloro-17α-hydroxy-1,4-pregnadiene-3,20-dione 17-acetate.

EXAMPLE 19

*6α-Methyl-17α-Hydroxy-4,9(11)-Pregnadiene-3,20-Dione*

A. *6α - methyl-17α,21-dihydroxy-4,9(11)-pregnadiene-3,20-dione 21-acetate.*—A solution of 5.0 g. of 6α-methylhydrocortisone acetate in a mixture of 20 ml. of dimethylformamide and 5 ml. of dry pyridine is chilled in an ice bath and there is added dropwise a solution of 3.2 g. of methanesulfonyl chloride in 30 ml. of dimethylformamide. Stirring is continued at room temperature for 28 hours after which the mixture is poured into ice-water. A precipitate forms which is filtered, washed with water and crystallized from acetone-hexane to give 6α - methyl - 17α,21-dihydroxy-4,9(11)-pregnadiene-3,20-dione 21-acetate.

B. *6α-methyl-17α,21-dihydroxy-4,9(11) - pregnadiene-3,20-dione.*—A mixture of 2.0 g. of the pregnadiene of Example 19A and 100 ml. of 0.27 N methanolic perchloric acid is stirred at room temperature for 18 hours. The reaction mixture is poured into water and the precipitate which forms is filtered and recrystallized from acetone to give 6α-methyl-17α,21-dihydroxy-4,9(11)-pregnadiene-3,20-dione.

C. *6α-methyl-17α-hydroxy-4,9(11)-pregnadiene - 3,20-dione.*—A solution of 10.4 g. of 6α-methyl-17α,21-dihydroxy-4,9(11)-pregnadiene-3,20-dione (the compound of Example 19B) in 100 ml. of dry pyridine is chilled in a Dry Ice-acetone bath and there is added a solution of 6 g. of p-toluenesulfonyl chloride in 50 ml. of methylene chloride. The mixture is stirred in the cold bath for 2 hours and then kept at −20° C. for 24 hours. The reaction mixture is then diluted with methylene chloride and the solution washed with water, 10% sulfuric acid, 10% sodium bicarbonate, very dilute hydrochloric acid and water. The solution is dried over magnesium sulfate, filtered and concentrated to a residue which is dissolved in acetone, treated with decolorizing carbon. The clarified solution is warmed on the steam bath, and there is added a warm solution of 10 g. of sodium iodide in acetone. The reaction mixture is heated on the steam bath for five minutes, three ml. of acetic acid added, and after being warmed a few minutes is treated with aqueous sodium bisulfite to reduce the free iodine. The resulting pale yellow solution is poured into water. A precipitate forms, which is filtered, washed with water, and crystallized from acetone-ether to give 6α-methyl-17α-hydroxy-4,9(11)-pregnadiene-3,20-dione.

By subjecting the compound of Example 19C to the halogenation and/or esterification reactions described heretofore there is obtained the following compounds: 6α-methyl-17α-hydroxy-4,9(11)-pregnadiene-3,20-dione 17-acetate, 6α - methyl-17α-hydroxy-4,9(11)-pregnadiene-3,20-dione 17-caproate, 6α-methyl - 17α - hydroxy-4,9(11)-pregnadiene-3,20-dione 17 - (β - cyclopentylpropionate), 6α-methyl - 9α,11β - dichloro-17α-hydroxyprogesterone 17-acetate, 6α-methyl - 9α - chloro - 11β - fluoro-17α-hydroxyprogesterone 17-acetate, 6α-methyl-9α-bromo-11β-fluoro - 17α - hydroxyprogesterone 17-acetate, 6α-methyl-9α,11β-dichloro - 17α - hydroxyprogesterone 17-caproate, 6α-methyl-9α,11β-dichloro - 17α - hydroxyprogesterone 17-(β-cyclopentylpropionate), 6α-methyl-9α-bromo - 11β-chloro-17α-hydroxyprogesterone 17-caproate, 6α-methyl-9α-bromo - 11β - chloro-17α-hydroxyprogesterone 17-acetate, 6α-methyl-9α-iodo - 11β - chloro-17α-hydroxyprogesterone 17-acetate, 6α-methyl - 9α,11β - dibromo-17α-hydroxyprogesterone 17-acetate, 6α-methyl - 9α,11β-dichloro-17α-hydroxyprogesterone 17-acetate; in 50 ml. of acetic acid there is added 410 mg. of N-bromoacetamide followed by a solution of 220 mg. of hydrogen bromide in 4.5 ml. of acetic acid. The mixture is stirred at room temperature for one hour, then is poured into ice-water. A solid forms which is filtered, washed with water, then crystallized from acetone-hexane to give 6α-methyl-9α,11β-dibromo-17α-hydroxyprogesterone 17-acetate.

EXAMPLE 20

*6α-Methyl-17α-Hydroxy-1,4,9(11)-Pregnatriene-3,20-Dione*

A. *6α-methyl-17α,21-dihydroxy-1,4,9(11)-pregnatriene-3,20-dione 21-acetate.*—Five grams of 6α-methyl-11β,17α,21-trihydroxy-1,4-pregnadiene-3,20-dione 21-acetate are dissolved in 20 ml. of dry dimethylformamide and 4 ml. of dry pyridine. The solution is chilled in an ice bath and to it is added dropwise 3.05 g. of methanesulfonyl chloride which has been diluted to 30 ml. with dimethylformamide. After the addition has been completed, stirring is continued at room temperature for 48 hours. The reaction mixture is then poured into cold, dilute sulfuric acid. A precipitate forms which is filtered, air-dried, and crystallized from methanol to yield 6α-methyl-17α,21-dihydroxy-1,4,9(11)-pregnatriene-3,20-dione 21-actate, $$\lambda_{max.}^{MeOH} \ 240 \ m\mu$$

B. *6α-methyl-17α,21-dihydroxy-1,4,9(11)-pregnatriene-3,20-dione.*—Two grams of 6α-methyl-17α,21-dihydroxy-1,4,9(11)-pregnatriene-3,20-dione 21-acetate, prepared as described in Example 20A, is hydrolyzed with methanolic perchloric acid in the manner described in Example 1B to give 6α-methyl-17α,21-dihydroxy-1,4,9(11)-pregnatriene-3,20-dione.

C. *6α-methyl-17α-hydroxy-1,4,9(11)-pregnatriene-3,20-dione.*—In the manner described in Example 19C 6α-methyl-17α,21-dihydroxy-1,4,9(11)-pregnatriene - 3,20-dione (the compound of Example 20B), is reacted with p-toluenesulfonyl chloride followed by sodium iodide and the resultant product isolated and purified to give 6α-methyl-17α-hydroxy-1,4,9(11)-pregnatriene-3,20-dione.

By subjecting the compounds of Example 20C to the halogenation and/or esterification reactions described heretofore there is obtained the following compounds: 6α-methyl - 17α - hydroxy - 1,4,9(11) - pregnatriene-3,20-dione 17-acetate, 6α - methyl - 9α,11β - dichloro-17α-hydroxy-1,4-pregnadiene - 3,20 - done 17-acetate, 6α-methyl-9α - bromo - 11β - chloro-17α-hydroxy-1,4-pregnadiene-3,20-dione 17-acetate.

EXAMPLE 21

*6α-Methyl-17α-Bromoprogesterone*

A. *17α-bromoprogesterone 3,20-bisethylene ketal.*—Ten grams of 17α-bromoprogesterone is reacted with ethylene glycol in the presence of p-toluenesulfonic acid, by refluxing the 17α-bromoprogesterone in 1 liter of dry benzene and 400 ml. of ethylene glycol under a Dean-Stark separator for 18 hours in the presence of 500 mg. of p-toluenesulfonic acid. The reaction mixture is diluted with water and the organic layer separated. The benzene solution is washed with 5% aqueous bicarbonate and water and concentrated to a residue under reduced pressure. Addition of ether to this residue gives a solid. This resultant product is recrystallized from acetone-ether to give 17α-bromoprogesterone 3,20-bisethylene ketal.

B. *5α,6α - epoxy - 17α - bromopregnane - 3,20 - dione 3,20 - bisethylene ketal.*—Five grams of the bisethylene ketal prepared in Example 21A, is reacted with monoperphthalic acid, by preparing a solution of the bisethylene ketal from 21A, in chloroform containing 4 drops of pyridine. To this solution is added a solution of an equivalent amount of monoperphthalic acid in 200 ml. of ether at 0° C. Allow the mixture to stand at 0° C. for 24 hours, then dilute with ether and wash three times with 5% aqueous bicarbonate and twice with water. The solution is dried over magnesium sulfate, filtered and the solvent removed in vacuo. The resultant residue is chromatographed on Florisil in hexane. The column is first eluted with 20–40% ether in hexane to separate out the 5β,6β-epoxide epimers from the desired product. The column is then eluted with 100% ether and 1% acetone in ether, and the eluates concentrated in vacuo to a residue which is crystallized from acetone-hexane, to give 5α,6α-epoxy-17α-bromopregnane-3,20-dione 3,20 - bisethylene ketal.

C. *5α - hydroxy - 6β - methyl - 17α - bromopregnane-3,20 - dione.*—Five grams of the 5α,6α-epoxy bisethylene ketal of Example 21B is reacted with methyl magnesium iodide and the resultant product treated with oxalic acid, by adding the 5α,6α-epoxide from 21B, above in 200 ml. of tetrahydrofuran and 200 ml. of benzene to a Grignard reagent prepared from 5 g. of magnesium and 15 ml. of methyl iodide in 200 ml. of ether. Distill off the ether and reflux the reaction mixture for 19 hours. The mixture is chilled and an aqueous ammonium chloride solution added. The solvent layers are separated and the organic layer washed with water and concentrated. The resultant residue is dissolved in 200 ml. of 90% aqueous methanol refluxed with 3 g. of oxalic acid for 30 minutes and poured into water. The solid which forms is filtered off. The isolated product is crystallized from acetone-hexane to give 5α-hydroxy-6β-methyl-17α-bromopregnane-3,20-dione.

D. *6α-methyl-17α-bromoprogesterone.*—Two grams of 5α - hydroxy - 6β - methyl - 17α - bromopregnane - 3,20-dione, prepared as described in Example 21C, is dissolved in 150 ml. of ethanol containing 0.5 ml. of concentrated hydrochloric acid. The solution is refluxed for 30 minutes, then cooled and poured into water. A solid separates which is filtered and crystallized from aqueous methanol to give 6α-methyl-17α-bromoprogesterone.

EXAMPLE 22

*6α-Methyl-17α-Bromo-4,9(11)-Pregnadiene-3,20-Dione*

A. *6α-methyl-11β-hydroxy-17α - bromoprogesterone.*—In the manner described in Example 15A, 4 g. of 6α-methyl-17α-bromoprogesterone the compound of Example 21, is subjected to the action of a culture of the organism *Curvularia lunata* and the resultant product isolated and purified to give 6α-methyl-11β-hydroxy-17α-bromoprogesterone.

B. *6α - methyl - 17α - bromo - 4,9(11) - pregnadiene-3,20-dione.*—Two grams of 6α-methyl-11β-hydroxy-17α-bromoprogesterone, is refluxed for 30 minutes with a solution of 4 g. of dry lithium bromide in 50 ml. of glacial acetic acid. The solution is poured into water. A solid separates which is filtered, washed with water and crystallized from acetone-hexane to give 6α-methyl-17α-bromo-4,9(11)-pregnadiene-3,20-dione.

By subjecting the compound of Example 22B, to the halogenation and/or esterification reactions described heretofore there is obtained the following compounds: 6α-methyl-9α,11β - dichloro - 17α - bromoprogesterone, 6α-methyl-9α,17α-dibromo - 11β - fluoroprogesterone, 6α-methyl-9α-iodo-11β-chloro-17α-bromoprogesterone.

EXAMPLE 23

*6α-Methyl-17α-Hydroxy-1,4,9(11)-Pregnatriene-3,20-Dione*

Five grams of 6α-methyl-17α-hydroxy-4,9(11)-pregnadiene-3,20-dione is fermented with *Corynebacterium simplex* (A.T.C.C. 6946) according to the procedure of U.S. Patent No. 2,837,464 as follows.

A 100 ml. broth culture containing a 0.1% yeast extract concentration, 9.0 ml. of 0.2 M $KH_2PO_4$ and 9.0 ml. $Na_2HPO_4$, contained in a 300 ml. Erlenmeyer flask, is seeded with 1 ml. of a 24 hour broth culture of *Corynebacterium simplex*. The flask is incubated at 28° C. for 28 hours. A second 300 ml. Erlenmeyer flask containing 150 mg. of sterile 6α,17α-dimethyl-4,9(11)-pregnadiene-3,20-dione in 5.0 ml. acetone is inoculated with the 24 hour culture of *Corynebacterium simplex*. The culture-containing steroid solution is incubated for 48 hours at 28° C. to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6α-methyl-17α-hydroxy-1,4,9(11)-pregnatriene-3,20-dione.

In similar manner, the aforementioned 4,9(11)-dienes are subjected to the action of a culture of *Corynebacterium simplex* and the resultant products isolated and purified to give respectively, 6α-methyl-17α-hydroxy-1,4,9(11)-pregnatriene - 3,20 - dione 17 - acetate, 6α - methyl - 17α-hydroxy - 1,4,9(11) - pregnatriene - 3,20 - dione 17 - caporate, 6α - methyl - 17α - hydroxy - 1,4,9(11) - pregnatriene - 3,20 - dione 17β - cyclopentylpropionate, and 6α-methyl-17α-bromo-1,4,9(11)-pregnatriene-3,20-dione.

EXAMPLE 24

*6α-Methyl-17α-Bromo-9α,11β-Dichloro-1,4-Pregnadiene-3,20-Dione*

In a manner similar to that described heretofore, 6α-methyl-17α-bromo - 1,4,9(11) - pregnatriene-3,20-dione is chlorinated with chlorine gas in carbon tetrachloride in the presence of pyridine and the resultant product isolated and purified to give 6α-methyl-17α-bromo-9α,11β-dichloro-1,4-pregnadiene-3,20-dione.

In the above described manner, any of the 1,4,9(11)-pregnatrienes prepared as heretofore described may be chlorinated to give 6α-methyl-9α,11β-dichloro-17α-hydroxy - 1,4 - pregnadiene - 3,20 - dione, 6α - methyl - 9α,11β - dichloro - 17α - hydroxy - 1,4 - pregnadiene - 3,20 - dione 17 - acetate, 6α - methyl - 9α,11β - dichloro - 17α - hydroxy - 1,4 - pregnadiene - 3,20 - dione 17-caproate, 6α - methyl - 9α,11β - dichloro - 17α - hydroxy - 1,4 - pregnadiene - 3,20 - dione 17β - cyclopentylpropionate.

We claim:

1. A compound selected from the group consisting of pregnanes having the following formulae:

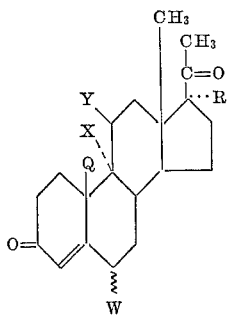

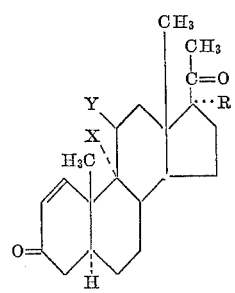

and

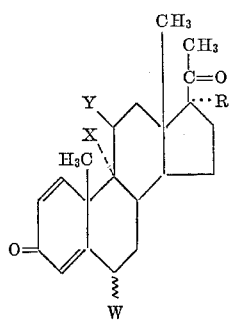

wherein X is a halogen of atomic weight greater than 19; Y is a halogen of atomic weight less than 126 and being at least as electronegative as X; Q is a member of the group consisting of hydrogen and methyl; R is a member of the group consisting of halogen of atomic weight greater than 19 and less than 126; hydroxy and acyloxy radicals of hydrocarbon carboxylic acids containing up to 12 carbon atoms; and W is a member of the group consisting of hydrogen and methyl.

2. 9α-X-11β-Y-17α-hydroxyprogesterone wherein X is a halogen of atomic weight greater than 19, and Y is a halogen of atomic weight less than 126 and being at least as electronegative as X.

3. 9α-X-11β-Y-17α-hydroxy - 1 - dehydroprogesterone wherein X is a halogen of atomic weight greater than 19, and Y is a halogen of atomic weight less than 126 and being at least as electronegative as X.

4. 9α-X-11β-Y-17α - hydroxy - 1 - allopregnene-3,20-dione wherein X is a halogen of atomic weight greater than 19, and Y is a halogen of atomic weight less than 126 and being at least as electronegative as X.

5. 9α-X-11β-Y-17α-R-progesterone wherein X is a halogen of atomic weight greater than 19; Y is a halogen of atomic weight less than 126 and being at least as electronegative as X; and R is an acyloxy radical of a hydrocarbon carboxylic acid containing up to 12 carbon atoms.

6. 9α-X-11β-Y-17α-R-1 - dehydroprogesterone wherein X is a halogen of atomic weight greater than 19; Y is a halogen of atomic weight less than 126 and being at least as electronegative as X; and R is an acyloxy radical of a hydrocarbon carboxylic acid containing up to 12 carbon atoms.

7. 9α-X-11β-Y-17α-R-progesterone wherein X is a halogen of atomic weight greater than 19; Y is a halogen of atomic weight less than 126 and being at least as electronegative as X; and R is a halogen of atomic weight greater than 19 and less than 126.

8. 9α-X-11β-Y-17α-R-6α - methylprogesterone wherein X is a halogen having an atomic weight greater than 19; Y is a halogen having an atomic weight less than 126 and being at least as electronegative as X; and R is an acyloxy radical of a hydrocarbon carboxylic acid containing up to 12 carbon atoms.

9. 9α-X-11β-Y-17α-R-6α-methyl - 1 - dehydroprogesterone wherein X is a halogen having an atomic weight greater than 19; Y is a halogen having an atomic weight less than 126 and being at least as electronegative as X; and R is an acyloxy radical of a hydrocarbon carboxylic acid containing up to 12 carbon atoms.

10. 9α-X-11β-Y-6-methyl - 17α - hydroxyprogesterone wherein X is a halogen having an atomic weight greater than 19; and Y is a halogen having an atomic weight less than 126 and being at least as electronegative as X.

11. 9α,11β-dichloro-17α-hydroxyprogesterone.

12. 9α,11β-dichloro-17α-hydroxy - 1 - dehydroprogesterone.

13. 9α,11β-dichloro-17α-hydroxyprogesterone 17-acetate.

14. 9α,11β-dichloro-17α - hydroxyprogesterone 17-caproate.

15. 9α,11β-dichloro-17α-hydroxy - 1 - dehydroprogesterone 17-acetate.

16. 9α-chloro-11β-fluoro-17α-hydroxyprogesterone 17-acetate.

17. 9α-bromo-11β-chloro-17α-hydroxyprogesterone 17-acetate.

18. 9α-bromo-11β-fluoro-17α-hydroxyprogesterone 17-acetate.

19. 6α-methyl-9α,11β-dichloro - 17α - hydroxyprogesterone 17-acetate.

20. 6α-methyl-9α,11β-dichloro - 17α - hydroxyprogesterone 17-caproate.

21. 6α-methyl - 9α,11β - dichloro-17α-hydroxy-1-dehydroprogesterone 17-acetate.

22. 6α-methyl-9α-chloro - 11β - fluoro-17α-hydroxyprogesterone 17-acetate.

No references cited.